US011880102B2

(12) United States Patent
Kang et al.

(10) Patent No.: US 11,880,102 B2
(45) Date of Patent: *Jan. 23, 2024

(54) DISPLAY DEVICE

(71) Applicant: LG ELECTRONICS INC., Seoul (KR)

(72) Inventors: Seunggyu Kang, Seoul (KR); Hyuncheol Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,803

(22) Filed: Jan. 31, 2023

(65) Prior Publication Data

US 2023/0176408 A1 Jun. 8, 2023

Related U.S. Application Data

(63) Continuation of application No. 17/156,037, filed on Jan. 22, 2021, now Pat. No. 11,592,697.

(30) Foreign Application Priority Data

Feb. 20, 2020 (KR) ........................ 10-2020-0021132

(51) Int. Cl.
*G02F 1/1333* (2006.01)
(52) U.S. Cl.
CPC .. *G02F 1/133314* (2021.01); *G02F 1/133322* (2021.01); *G02F 1/133325* (2021.01)

(58) Field of Classification Search
CPC ......... G02F 1/133314; G02F 1/133311; G02F 1/133322; G02F 1/133325
See application file for complete search history.

(56) References Cited

U.S. PATENT DOCUMENTS

| 2008/0150851 A1* | 6/2008 | Takaira ................. G06F 1/1601 345/84 |
| 2011/0157519 A1 | 6/2011 | Yusa |
| 2012/0162570 A1 | 6/2012 | Lee et al. |

(Continued)

FOREIGN PATENT DOCUMENTS

| KR | 101538791 | 7/2015 |
| KR | 1020150137576 | 12/2015 |

(Continued)

OTHER PUBLICATIONS

PCT International Application No. PCT/KR2020/003020, International Search Report dated Nov. 3, 2020, 3 pages.

(Continued)

*Primary Examiner* — Robert J Michaud
(74) *Attorney, Agent, or Firm* — LEE, HONG, DEGERMAN, KANG & WAIMEY

(57) ABSTRACT

A display device is disclosed. The display device includes a display panel, a frame positioned behind the display panel, a plate positioned between the display panel and the frame, and a side frame, which extends along an edge of the frame behind the frame and which is coupled to the frame, wherein the plate includes a base facing the frame, and a projection, which projects rearwards from the base through the frame and the side frame and which is bent at an end thereof so as to be coupled to the side frame.

17 Claims, 17 Drawing Sheets

(56) References Cited

U.S. PATENT DOCUMENTS

2017/0075380 A1* 3/2017 Park .................. G06F 1/1681
2019/0353952 A1  11/2019 Kawasoe et al.
2021/0263372 A1  8/2021 Kang et al.

FOREIGN PATENT DOCUMENTS

KR  1020160110834  9/2016
KR  1020190112455  10/2019

OTHER PUBLICATIONS

U.S. Appl. No. 17/156,037, Notice of Allowance dated Oct. 31, 2022, 11 pages.

* cited by examiner

DISPLAY DEVICE

CROSS-REFERENCE TO RELATED APPLICATIONS

This application is a continuation of U.S. patent application Ser. No. 17/156,037, filed on Jan. 22, 2021, which claims the benefit of earlier filing date and right of priority to Korean Patent Application No. 10-2020-0021132, filed on Feb. 20, 2020, the contents of which are all hereby incorporated by reference herein in their entirety.

BACKGROUND OF THE INVENTION

1. Field of the Invention

The present disclosure relates to a display device.

2. Description of the Related Art

With the development of the information society, demand for various kinds of display devices is increasing. In response to these needs, various kinds of display devices, such as LCDs (Liquid Crystal Display Devices), PDPs (Plasma Display Panels), ELDs (Electro luminescent Displays) and VFDs (Vacuum Fluorescent Displays), have been recently researched and used.

Among these, a display device using OLED (Organic Light-Emitting Diode) has an advantage in that the display device is excellent in brightness and viewing angle properties compared to an LCD device and does not require a backlight unit, thereby realizing an extremely slim device.

In order to follow recent trends in the development and consumption patterns of display devices, research with the goal of making display devices thinner and lighter has been intensively conducted.

SUMMARY OF THE INVENTION

Therefore, the present disclosure has been made in view of the above problems, and it is an object of the present disclosure to provide a display device capable of integrally coupling a plate, a frame and a side frame to one another.

Another object of the present disclosure is to provide a display device capable of simplifying an operation of coupling a plate, a frame and a side frame to one another.

Still another object of the present disclosure is to provide a display device having increased torsional rigidity and/or bending rigidity.

Yet another object of the present disclosure is to provide a display device having improved heat dissipation performance.

In accordance with an aspect of the present disclosure, the above and other objects can be accomplished by the provision of a display device including a display panel, a frame positioned behind the display panel, a plate positioned between the display panel and the frame, and a side frame, which extends along an edge of the frame behind the frame and which is coupled to the frame, wherein the plate includes a base facing the frame, and a projection, which projects rearwards from the base through the frame and the side frame and which is bent at an end thereof so as to be coupled to the side frame.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

A description will now be given in detail according to exemplary embodiments disclosed herein, with reference to the accompanying drawings. For the sake of brevity of description with reference to the drawings, the same or equivalent components are denoted by the same reference numbers, and a description thereof will not be repeated.

In general, suffixes such as "module" and "unit" may be used to refer to elements or components. The use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features, and it should be understood that the embodiments presented herein are not limited by the accompanying drawings. As such, the present disclosure should be construed to extend to any alterations, equivalents and substitutes, in addition to those which are particularly set out in the accompanying drawings.

It will be understood that although the terms "first," "second," etc. may be used herein to describe various elements, these elements should not be limited by these terms. These terms are only used to distinguish one element from another.

It will be understood that when an element is referred to as being "connected with" another element, intervening elements may be present. In contrast, it will be understood that when an element is referred to as being "directly connected with" another element, there are no intervening elements present.

A singular representation may include a plural representation unless the context clearly indicates otherwise.

In the present application, it should be understood that the terms "comprises," "includes," "has," etc. specify the presence of features, numbers, steps, operations, elements, components, or combinations thereof described in the specification, but do not preclude the presence or addition of one or more other features, numbers, steps, operations, elements, components, or combinations thereof.

Figure 1:
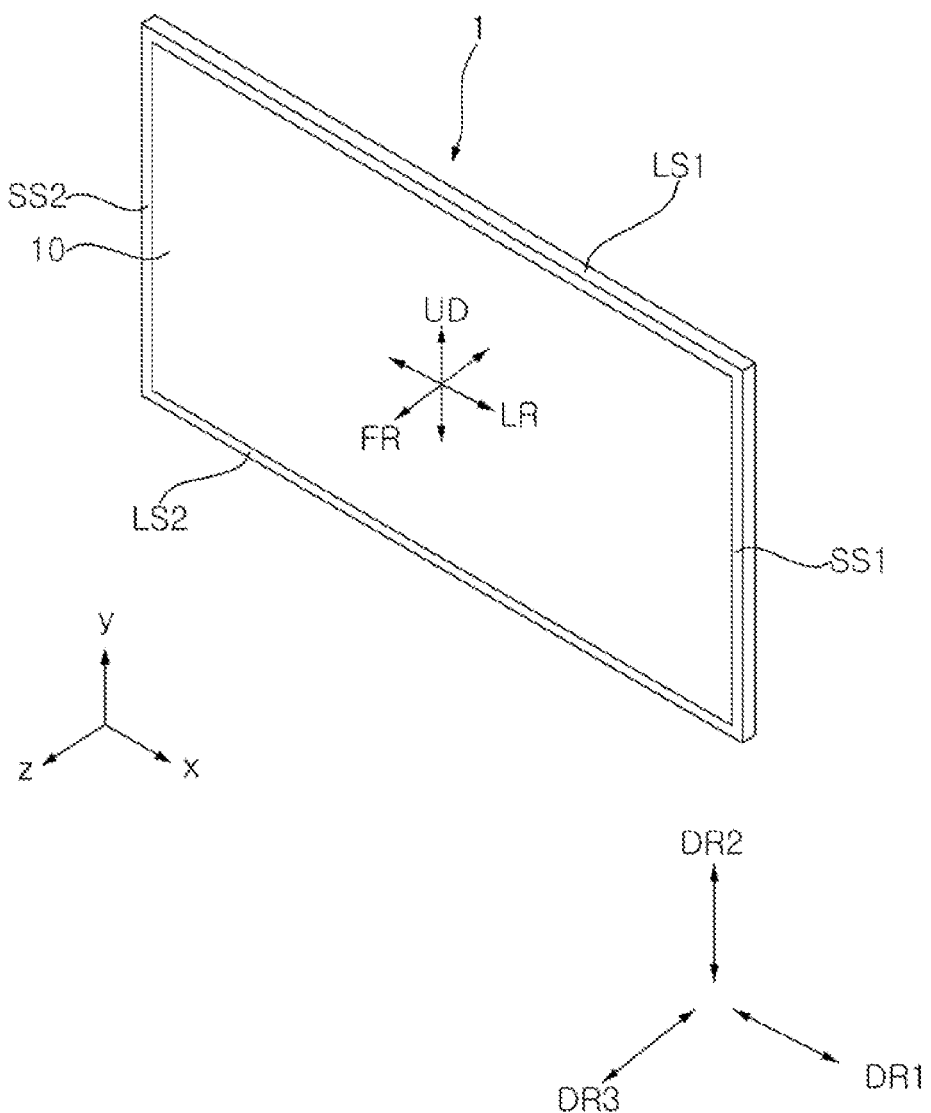
FIGS. 1 to 17 are views illustrating display devices according to embodiments of the present disclosure.

Referring to FIG. 1, the display device 1 may include a display panel 10. The display panel 10 may display a screen.

The display panel 10 may include a first long side LS1, a second long side LS2, which faces the first long side LS1, a first short side SS1 adjacent to the first long side LS1 and the second long side LS2, and a second short side SS2, which faces the first short side SS1. Although each of the first and second long sides LS1 and LS2 is illustrated and described as being longer than each of the first and second short sides SS1 and SS2 for convenience of explanation, the length of each of the first and second long sides LS1 and LS2 may be almost the same as that of each of the first and second short sides SS1 and SS2.

A direction parallel to the first and second long sides LS1 and LS2 of the display panel 10 may be referred to as a first direction DR1 or a lateral direction LR. A direction parallel to the first and second short sides SS1 and SS2 of the display panel 110 may be referred to as a second direction DR2 or a vertical direction UD. A direction perpendicular to the first and second long sides LS1 and LS2 and the first and second short sides SS1 and SS2 of the display panel 10 may be referred to as a third direction DR3 or an anteroposterior direction FR. Here, the direction in which the display panel 10 displays an image may be referred to as a forward direction, and the direction opposite the forward direction may be referred to as a rearward direction.

Although the display panel 10 will hereinafter be described based on a display panel employing organic light-emitting diodes (OLED), the display panel 10 applicable to the present disclosure is not limited thereto.

Figure 2:
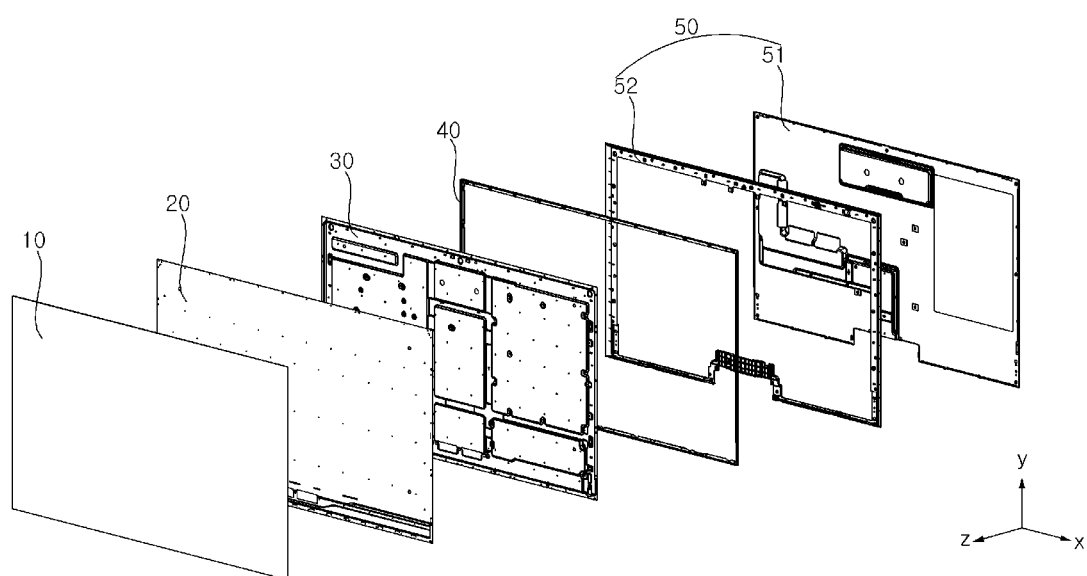
Figure 3:
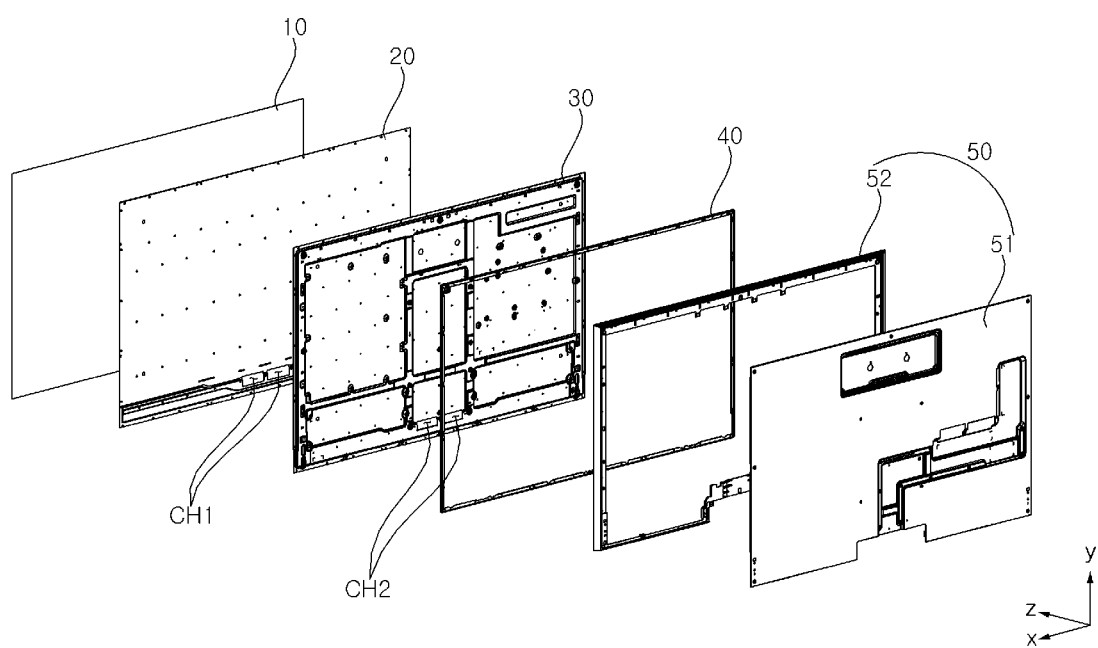

Referring to FIGS. 2 and 3, the display device 1 may include the display panel 10, a plate 20, a frame 30, a side frame 40 and a back cover 50.

The display panel 10 may define the front surface of the display device 1, and may display an image on the front surface of the display device 1. The display panel 10 may divide an image into a plurality of pixels, and may control the color, brightness and chroma of each of the pixels, thereby outputting the image. The display panel 10 may be divided into an active area, in which an image is displayed, and an inactive area, in which an image is not displayed. The display panel 10 may generate light corresponding to red, green or blue in response to a control signal.

The plate 20 may be positioned behind the display panel 10. The plate 20 may be configured to have a shape corresponding to the overall shape of the display panel 10. The plate 20 may absorb heat generated from the display panel 10 during operation of the display device 1, and/or heat generated from a PCB 60 coupled to the frame 30, which will be described later. The heat absorbed into the plate 20 may be uniformly dispersed throughout the plate 20.

Accordingly, it is possible to prevent the occurrence of local hot spots on the display panel 10 due to the heat generated during operation of the display device 1. Here, the plate 20 may be referred to as an inner plate, a radiation plate or a heat sink. The plate 20 may increase the torsional rigidity and/or the bending rigidity of the display device 1. For example, the plate 20 may include a metal material.

The frame 30 may be positioned behind the plate 20. The frame 30 may be configured to have a plate shape overall. A PCB 60 (see FIG. 15), on which a plurality of electronic elements are positioned, may be mounted on the frame 30. Here, the frame 30 may be referred to as a frame, a flat frame or a module cover. For example, the frame 30 may include a metal material.

The back cover 50 may cover the rear surface of the frame 30. The back cover 50 may define the rear surface of the display device 1. The back cover 50 may include a middle cover 51 and a side cover 52. The middle cover 51 may be configured to have a plate shape overall, and may be coupled to the side cover 52. The side cover 52 may extend along the edge of the middle cover 51, and may be positioned adjacent to the side frame 40. For example, the middle cover 51 may include a metal material, and the side cover 52 may include a plastic material.

Each of the plate 20 and the frame 30 may have formed therein cable holes CH1 and CH2 through which cables (not shown) that are electrically connected to the display panel 10 extend.

Figure 4:
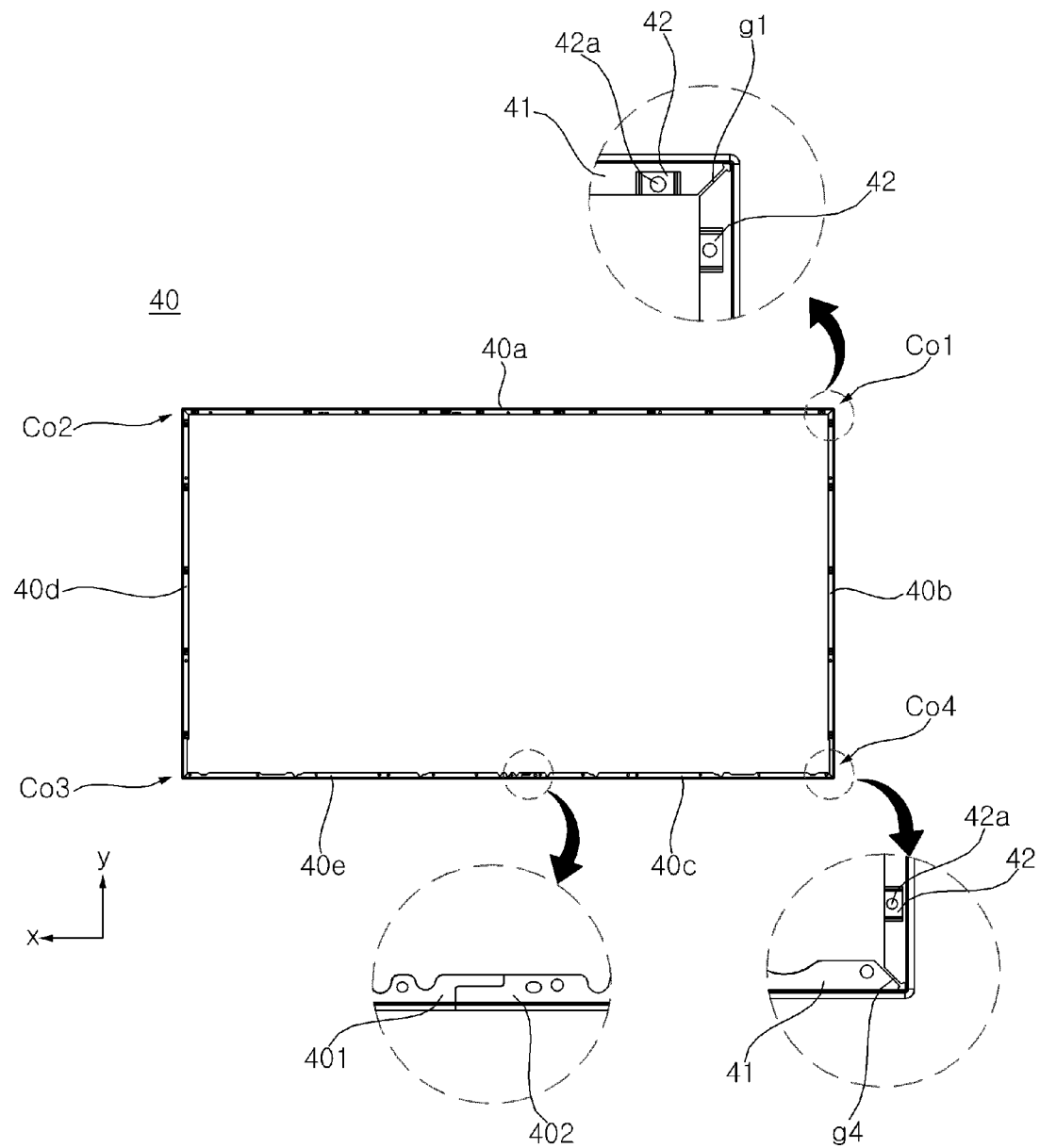

Referring to FIG. 4, the side frame 40 may include a plurality of parts, which are connected to each other so as to form corners Co (Co1, Co2, Co3 and Co4). The plurality of parts may include a first part 40a, a second part 40b, a third part 40c, a fourth part 40d, and a fifth part 40e.

The first part 40a may extend along the upper side of the frame 30. The second part 40b, which extends from the first part 40a, may be bent at the first corner Co1, and may extend along the right side of the frame 30. The third part 40c, which extends from the second part 40b, may be bent at the fourth corner Co4, and may extend along the lower side of the frame 30. The fourth part 40d, which extends from the first part 40a, may be bent at the second corner Co2, and may extend along the left side of the frame 30. The fifth part 40e, which extends from the fourth part 40d, may be bent at the third corner Co3, and may extend along the lower side of the frame 30. The end of the fifth part 40e may be coupled to the end 402 of the third part 40c through welding.

One of the plurality of parts may be spaced apart from an adjacent one of the plurality of parts by a predetermined gap at a corresponding one of the corners Co. For example, the first part 40a may be spaced apart from the second part 40b by a first gap g1 at the first corner Co1, and may be spaced apart from the fourth part 40d by a second gap g2 at the second corner Co2. The fourth part 40d may be spaced apart from the fifth part 40e by a third gap g3 at the third corner Co3, and the second part 40b may be spaced apart from the third part 40c by a fourth gap g4 at the fourth corner Co4. In other words, because the side frame 40 is provided with the first gap g1 the second gap g2, the third gap g3 and the fourth gap g4, the side frame 40 may be manufactured through a bending process.

Figure 5:
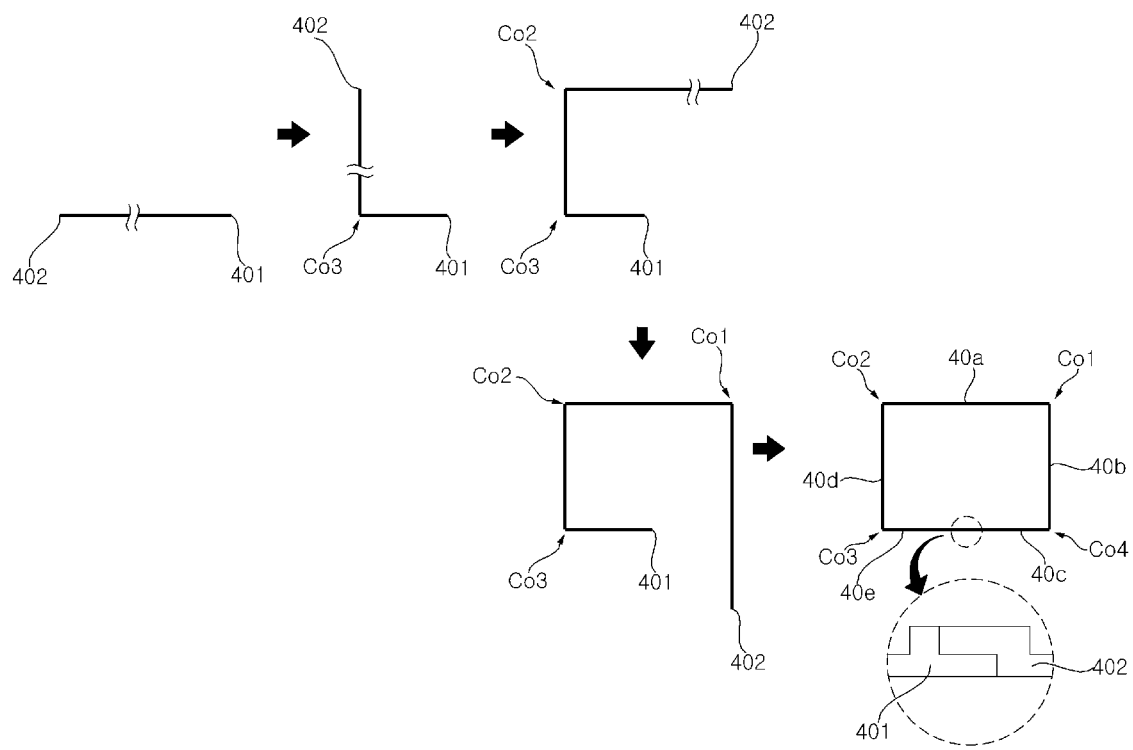

Referring to FIGS. 4 and 5, the side frame 40 may be bent four times, which corresponds to the number of corners Co, thereby defining the first part 40a, the second part 40b, the third part 40c, the fourth part 40d and the fifth part 40e. For example, the side frame 40 may be manufactured in a manner such that aluminum (Al) is extruded into a straight form and is then formed into a rectangular shape overall through a bending process, which will be described later.

The straight side frame 40 may be bent four times using a bending device (not shown) so as to sequentially form the third corner Co3, the second corner Co2, the first corner Co1 and the fourth corner Co4. Consequently, the side frame 40 may include the first part 40a, the second part 40b, the third part 40c, the fourth part 40d, and the fifth part 40e. It will be appreciated that the first to fourth gaps g1 to g4 are provided in order to prevent contact or interference between couplers 41 and 42 of the plurality of parts, which will be described later, through the bending process.

The first end 401 and the second end 402 of the side frame 40 may be coupled to each other through welding so as to form a closed loop.

Figure 6:
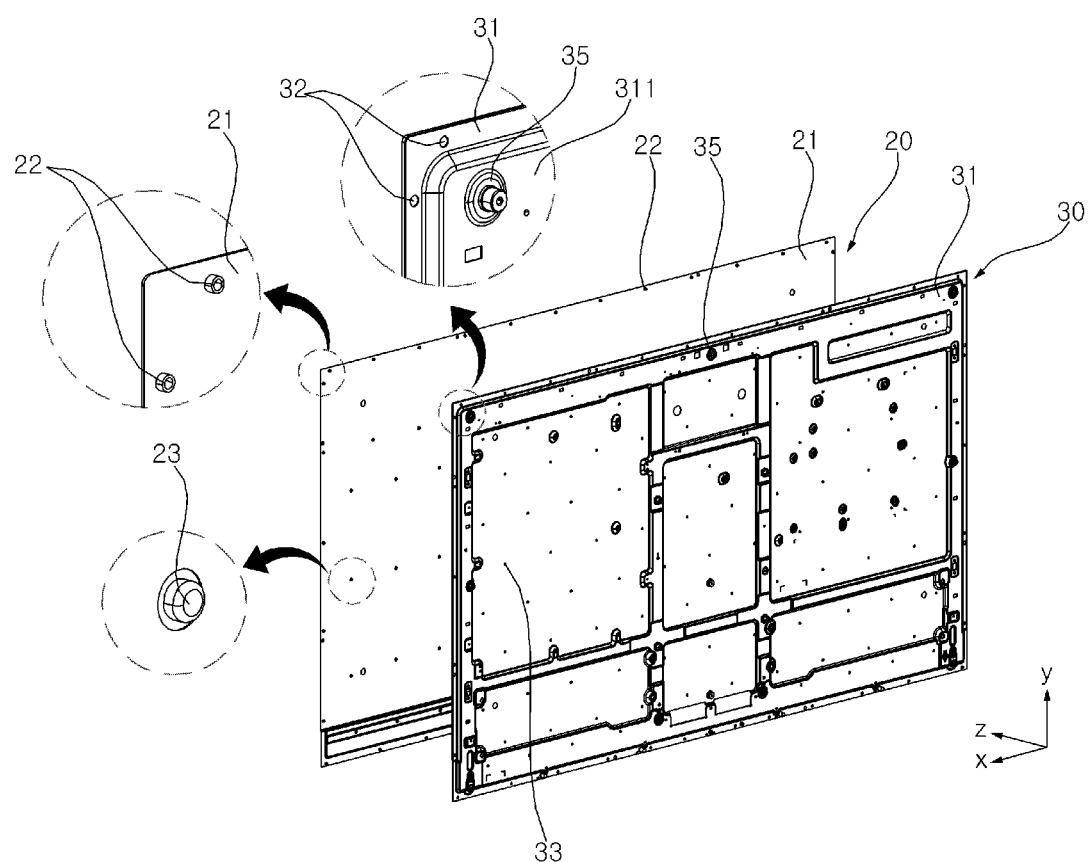

Referring to FIG. 6, the plate 20 may include a base 21, projections 22 and protrusions 23. The base 21 may face the frame 30, and may be flat overall.

The projections 22 may project rearwards from the base 21. The projections 22 may be positioned adjacent to the periphery of the base 21. The projections 22 may be positioned along the upper side, the lower side, the right side, and the left side of the base 21 so as to be spaced apart from each other. For example, each of the projections 22 may be configured to have the form of a hollow cylinder. Alternatively, each of the projections 22 may also be configured to have the form of a solid cylinder.

The protrusions 23 may project rearwards from the base 21. The protrusions 23 may be spaced apart from the projections 22 in the inward direction of the base 21. In other words, the projections 22 may be formed at the periphery of the base 21, and the protrusions 23 may be formed at the inner region of the base 21. The protrusions 23 may include a plurality of protrusions. For example, each of the protrusions 23 may be configured to have the form of a solid cylinder. Accordingly, embodying each of the protrusions 23 in the form of a solid cylinder may be advantageous in preventing heat generated from the PCV 160 from being transmitted to the display panel 10 via the protrusions 23, compared to hollow protrusions.

Figure 7:
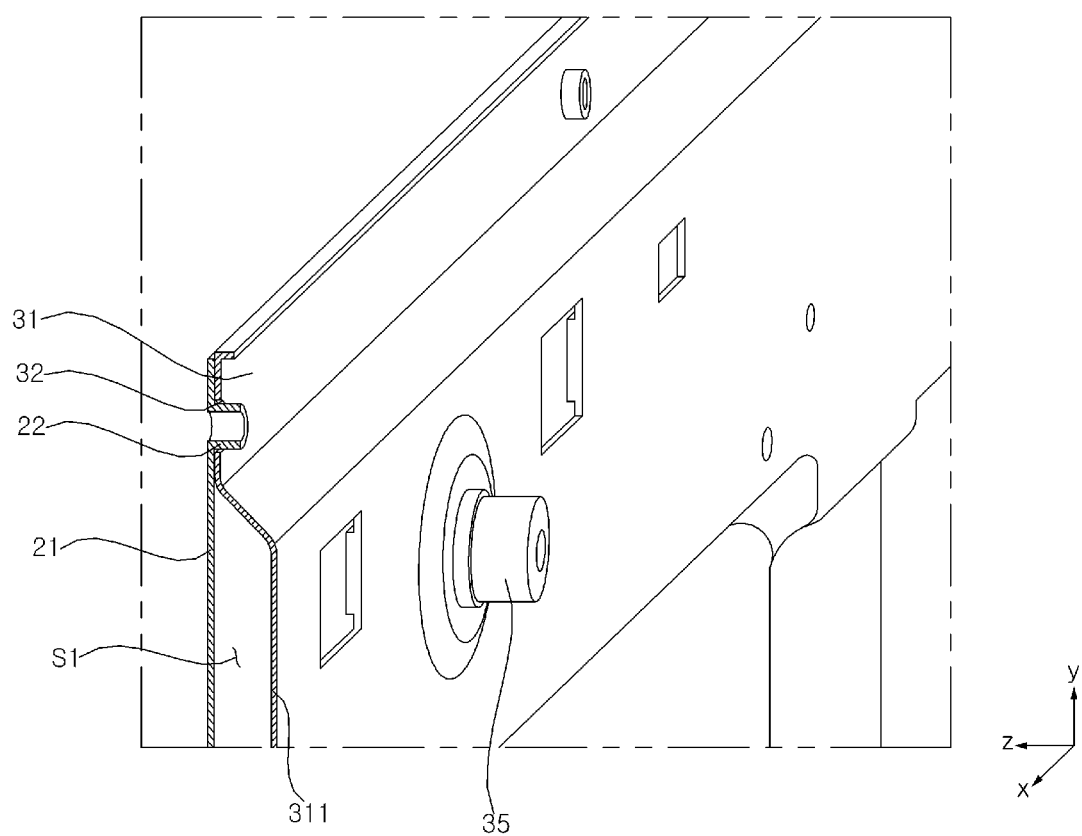

Referring to FIGS. 6 and 7, the frame 30 may include a base 31 facing the plate 20. Through holes 32 and coupling holes 33 may be formed through the base 31 of the frame 30. The through holes 32 and the coupling holes 33 may be formed through the base 31 in an anteroposterior direction.

The through holes 32 may be positioned close to the periphery of the base 31. The through holes 32 may include a plurality of through holes, which are positioned along the upper side, the lower side, the right side and the left side of the base 31 so as to be spaced apart from each other and to be aligned with the projections 22.

The coupling holes 33 may be spaced apart from the through holes 32 in the inward direction of the base 31. The coupling holes 33 may include a plurality of coupling holes, which are aligned with the protrusions 23.

Each of the projections 22 may extend through a corresponding one of the through holes 32 such that a portion thereof projects rearwards from the base 31. Each of the protrusions 23 may be fitted into a corresponding one of the coupling holes 33 such that a portion thereof projects rearwards from the base 31. Since the projections 22 extend through the through holes 32 while the protrusions 23 are fitted into the coupling holes 33, the plate 20 and the frame 30 may be coupled to each other.

Figure 8:
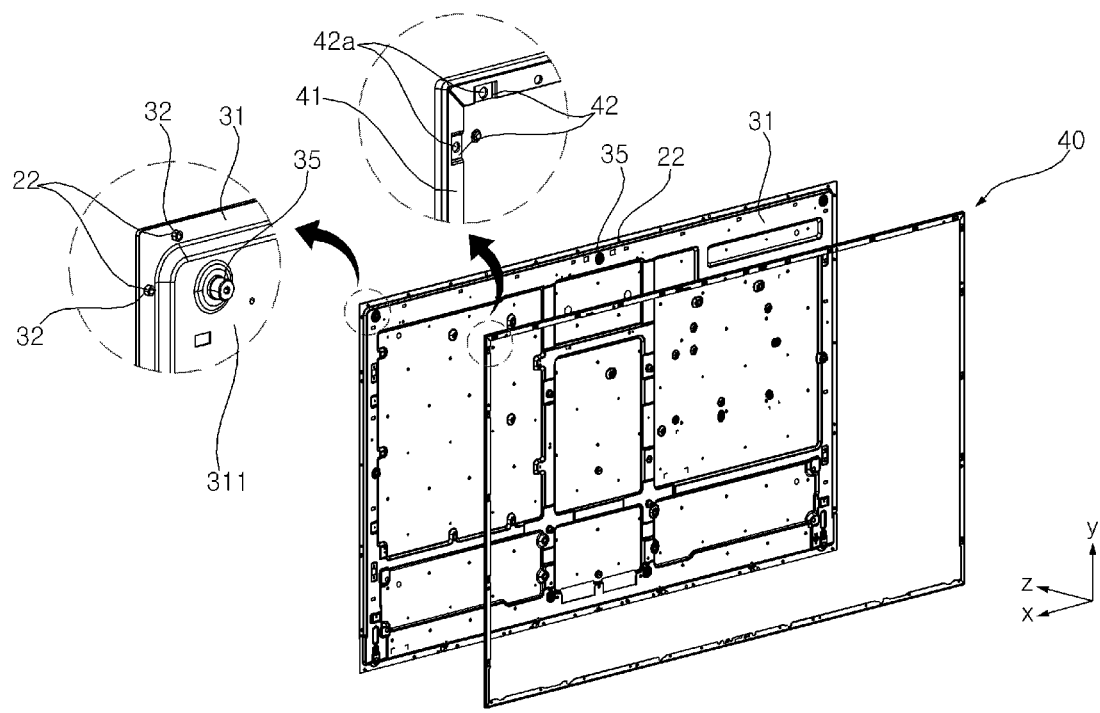
Figure 9:
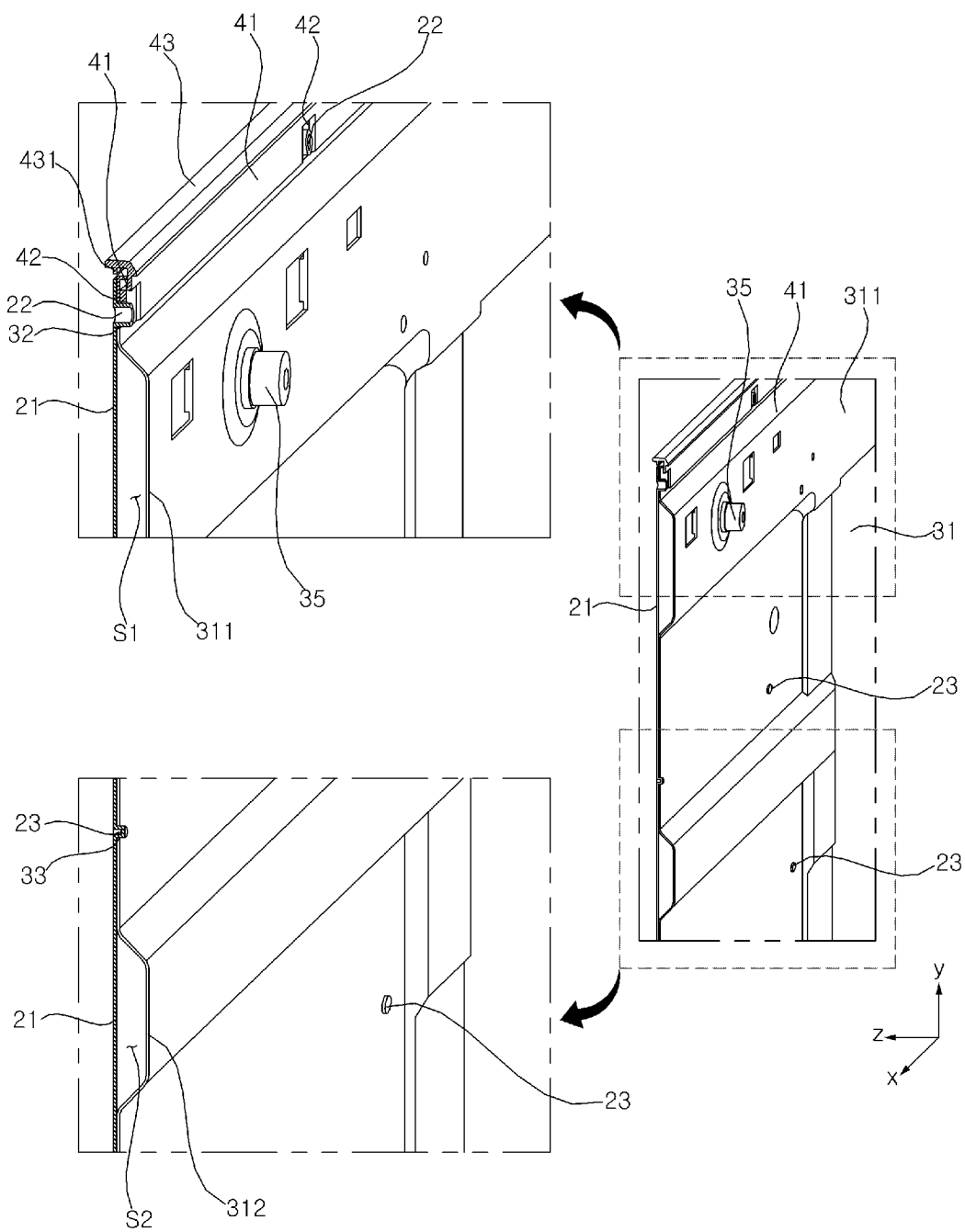

Referring to FIGS. 8 and 9, the side frame 40 may include the couplers 41 and 42 and a cover portion 43.

The couplers 41 and 42 may be positioned adjacent to the periphery of the frame 30 so as to face the rear surface of the frame 30, and may extend along the edge of the frame 30. The couplers 41 and 42 may be configured to have a rectangular shape overall. Here, the couplers 41 and 42 may be referred to as bodies of the first to fifth parts. The cover portion 43 may extend along the edge of the frame 30 while intersecting the couplers 41 and 42 so as to cover the lateral surface of the frame 30. For example, the cover portion 43 and the couplers 41 and 42 may intersect each other. The cover portion 43 may define the lateral appearance of the display device 1.

Each of the couplers 41 and 42 may include a flat portion 41 and a depressed portion 42. The flat portion 41 may face the rear surface of the base 31 of the frame 30. For example, the front surface of the flat portion 41 may be spaced apart from the rear surface of the base 31. The depressed portion 42 may be depressed forwards from the flat portion 41 so as to be in contact with the rear surface of the base 31. The depressed portion 42 may be depressed forwards from the flat portion 41 so as to form a step. The depressed portion 42 may include a plurality of depressed portions, which are provided along the flat portion 41 so as to be aligned with the projections 22.

The side frame 40 may be provided therein with coupling holes 42a. Specifically, the coupling holes 42a may be formed through the depressed portions 42 of the couplers 41 and 42. Each of the projections 22 may be sequentially fitted into the through hole 32 and the coupling hole 42a such that a portion thereof projects rearwards from the depressed portion 42.

Figure 10:
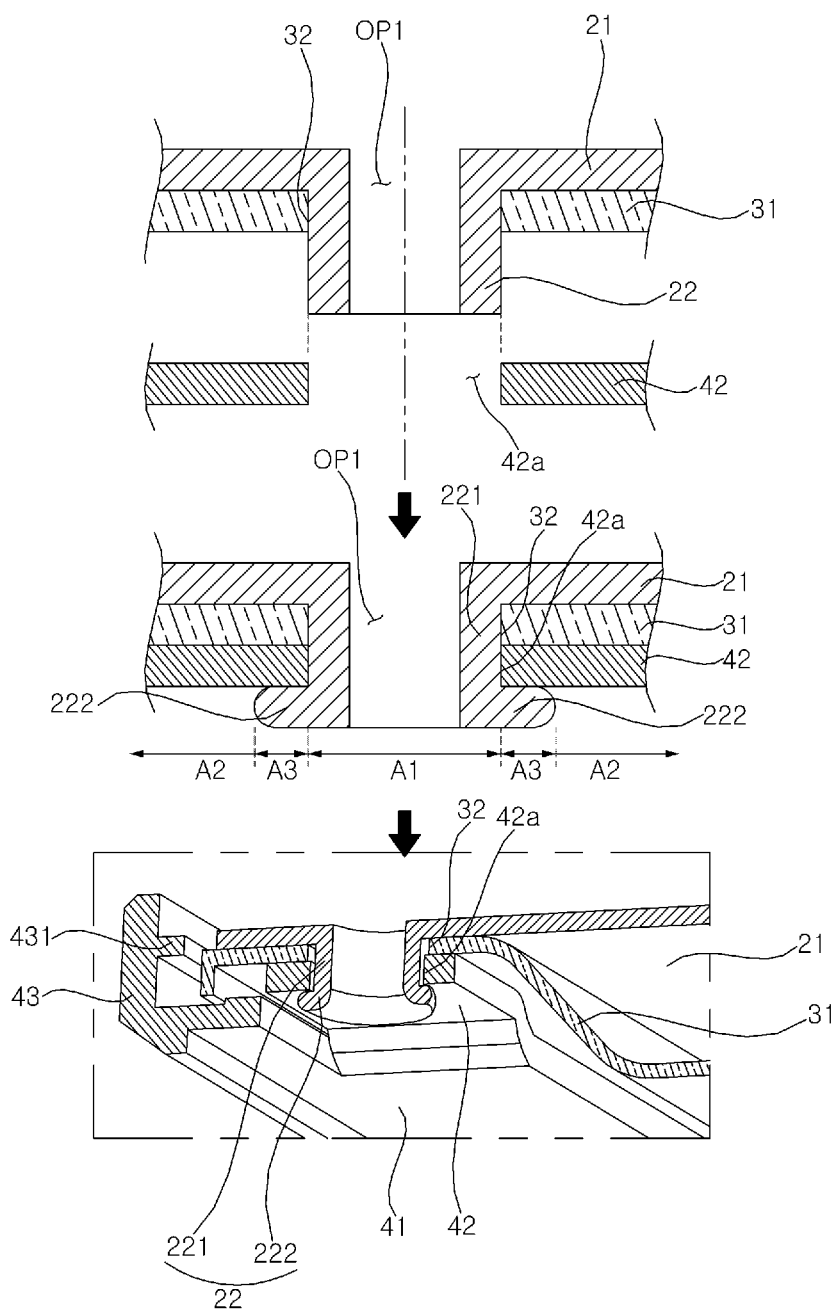
Figure 11:
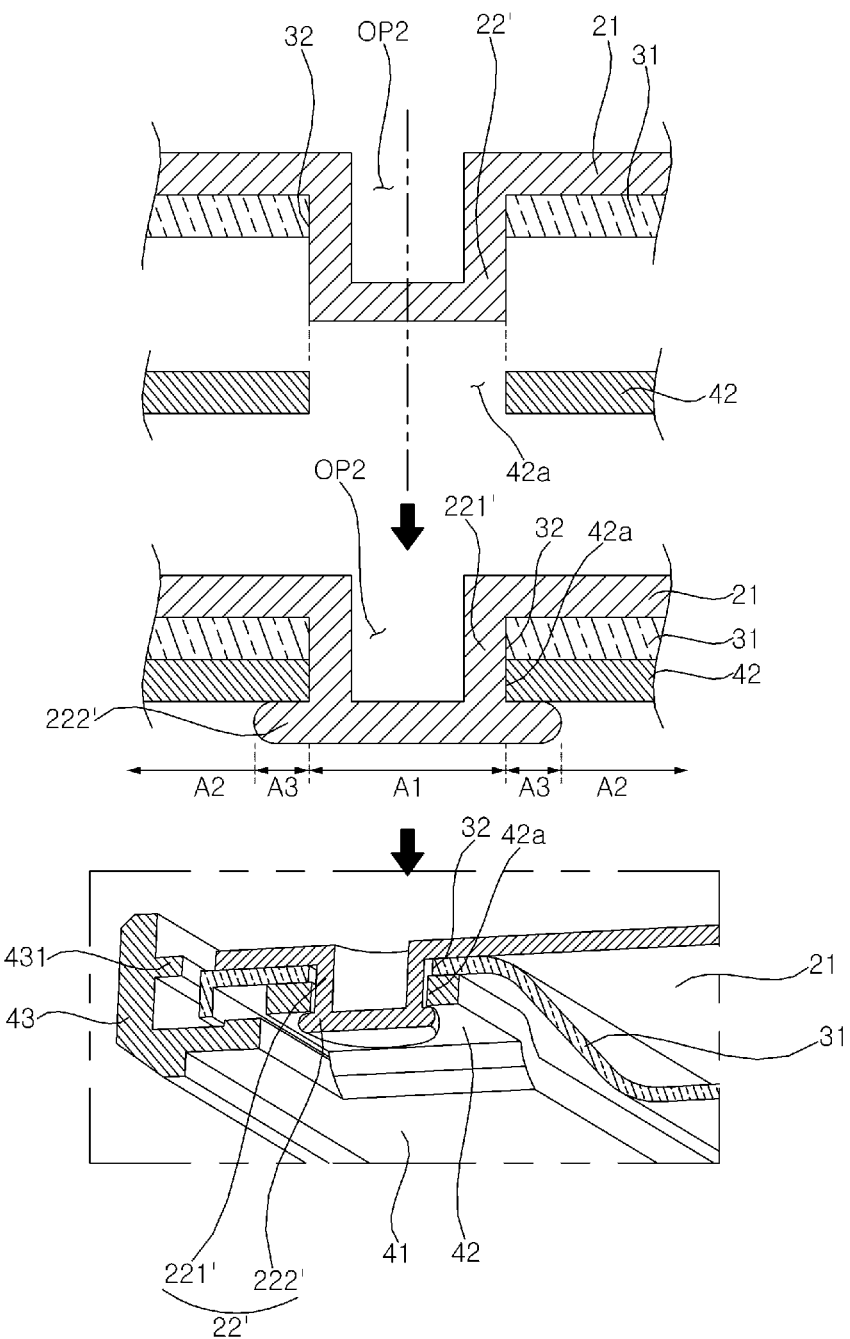
Figure 12:
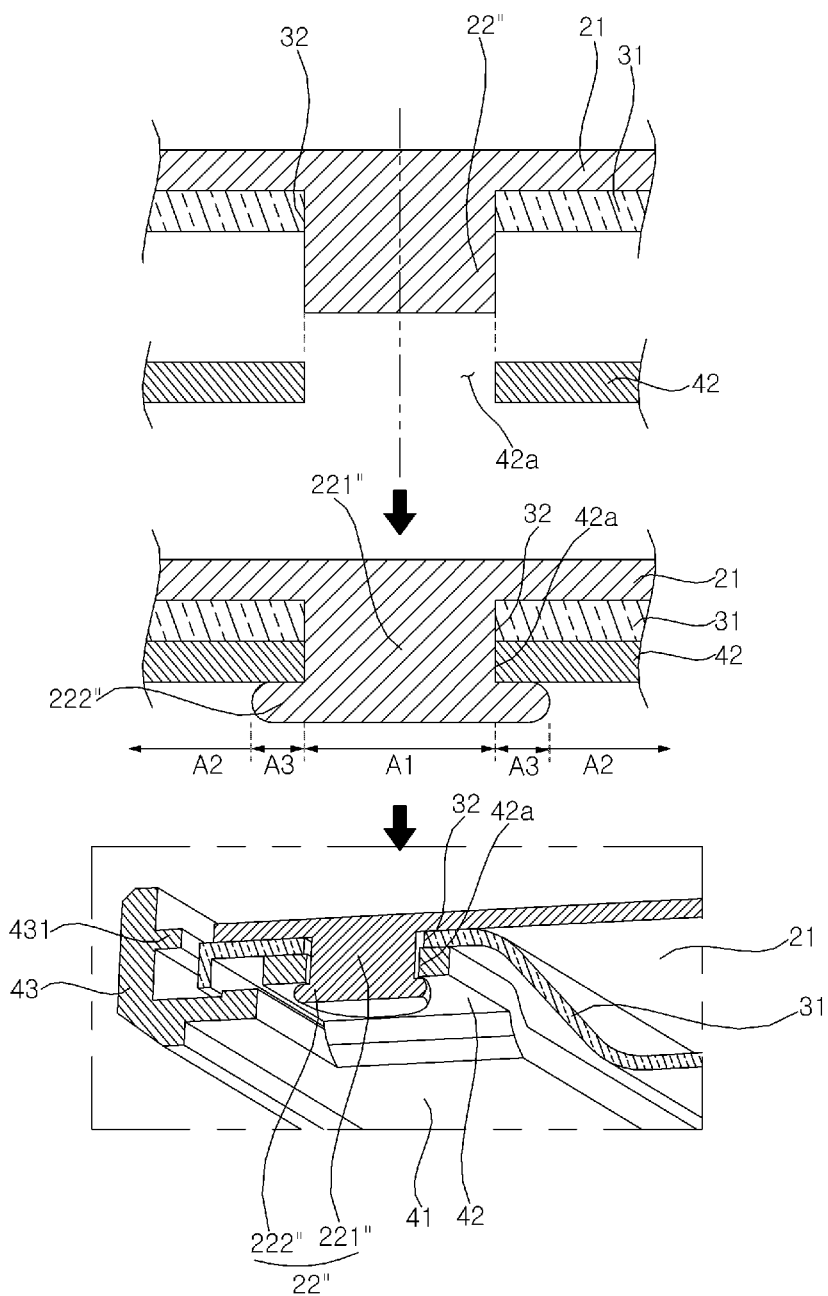

Referring to FIGS. 10 to 12, the projection 22 of the plate 20 may be sequentially fitted into the through hole 32 in the frame 30 and the coupling hole 42a in the side frame 40, and the end of the projection 22, which projects rearwards from the side frame 40, may be bent so as to be coupled to the side frame 40. Here, the end of the projection 22 may be bent through a punching process.

Consequently, the plate 20, the frame 30 and the side frame 40 may be in close contact with one another, and may thus be integrally coupled with one another. Furthermore, since the coupling procedure is simplified and an additional coupling element is obviated, it is possible to reduce material costs and there is an advantage in that the thickness of the display device 1 is reduced.

Referring to FIG. 10, the body 221 of the projection 22 may extend in an anteroposterior direction, and may be configured to have the form of a hollow cylinder so as to have therein an opening OP1, which is formed through the front and rear ends thereof. The end of the projection 22 that is passed through the through hole 32 and the coupling hole 42a may be bent so as to form a head 222, which comes into contact with the depressed portion 42. The head 222 may be bent radially at the end of the body 221, and may come into contact with the rear surface of the depressed portion 42. Here, the base 31 of the frame 30 may be secured between the base 21 of the plate 20 and the head 222. For example, the end of the head 222 opposite the end of the head 222 that is coupled to the end of the body 221 may be subjected to caulking treatment so as to increase the binding force between the head 222 and the depressed portion 42.

Referring to FIG. 11, a body 221' of a projection 22' may extend in an anteroposterior direction, and may be configured to have the form of a cylinder cap having therein an opening OP2, which is blind at the rear end thereof and open at the front end thereof. The end of the body 221' that is passed through the through hole 32 and the coupling hole 42a may be bent so as to form a head 222', which comes into contact with the depressed portion 42. The head 222' may be bent radially at the end of the body 221', and may come into contact with the rear surface of the depressed portion 42. Here, the base 31 of the frame 30 may be secured between the base 21 of the plate 20 and the head 222'. For example, the end of the head 222' opposite the end of the head 222' that is coupled to the end of the body 221' may be subjected to caulking treatment so as to increase the binding force between the head 222' and the depressed portion 42.

Referring to FIG. 12, a body 221" of a projection 22" may extend in an anteroposterior direction, and may be configured to have the form of a solid cylinder. The end of the body 221" that has passed through the through hole 32 and the coupling hole 42a may be bent so as to form a head 222", which comes into contact with the depressed portion 42. The head 222" may be bent radially at the end of the body 221", and may come into contact with the rear surface of the depressed portion 42. Here, the base 31 of the frame 30 may be secured between the base 21 of the plate 20 and the head 222". For example, the end of the head 222" opposite the end of the head 222" that is coupled to the end of the body 221" may be subjected to caulking treatment so as to increase the binding force between the head 222" and the depressed portion 42.

Referring again to FIGS. 10 to 12, the depressed portion 42 may have a first area A1, in which the coupling hole 42a is formed, and a second area A2 adjacent to the flat portion 41. Furthermore, the depressed portion 42 may have a third area A3, which is in contact with the head 222; 222'; 222". Accordingly, by virtue of the second area A2, the operation of bending the end of the body 221; 221'; 221" at the depressed portion 42 may be conducted without interference with the flat portion 41.

Each of the frame 30 and the side frame 40 may include a metal material. The base 31 of the frame 30 may have a thickness smaller than the thickness of the coupling portion 41, 42 of the side frame 40. In other words, a portion of the base 31 of the frame 30 may be pressed rearwards so as to provide a space, in which the PCB 60 (see FIG. 15), or to ensure torsional rigidity and/or bending rigidity. In order to facilitate the pressing operation, the base 31 of the frame 30 may be relatively thin. Meanwhile, the side frame 40 may be relatively thick.

Accordingly, in order to prevent the base 31 of the frame 30, which has a relatively small thickness, from being deformed beyond a specific threshold or breaking due to the operation of bending the end of the body 221; 221'; 221", it is preferable that the base 31 of the frame 30 be positioned between the base 21 of the plate 20 and the depressed portion 42 and that the bending operation be conducted at the depressed portion 42.

Figure 13:
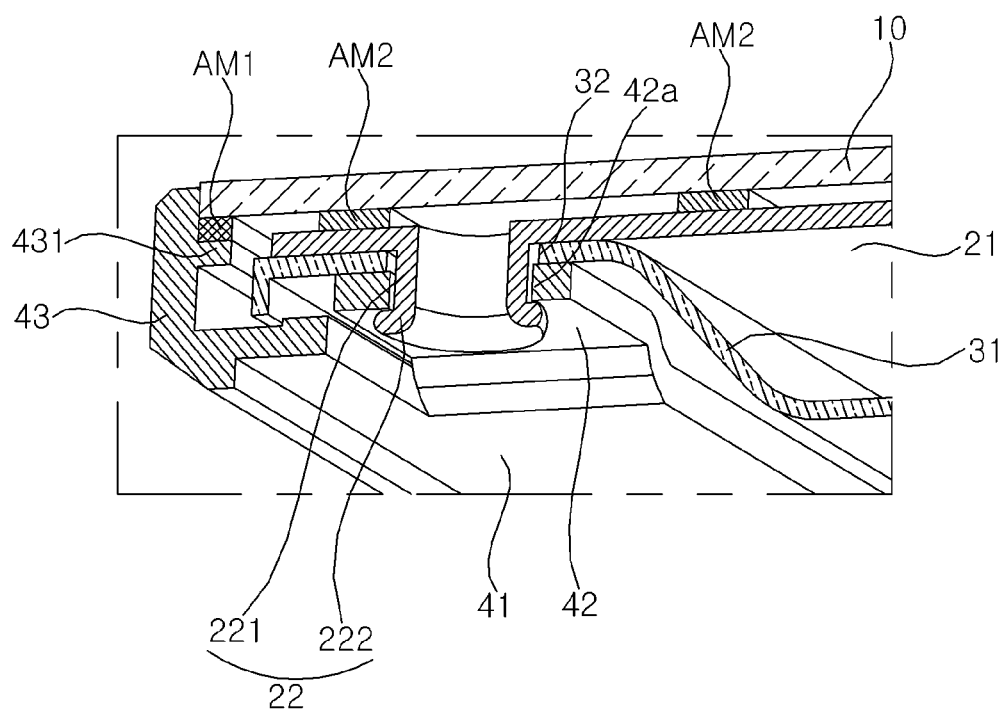

Referring to FIG. 13, an extension 431 may project from the inner surface of the cover portion 43 so as to face the rear surface of the display panel 10, and may extend along the inner surface of the cover portion 43.

A first adhesive member AM1 may be disposed between the display panel 10 and the extension 431, and may be coupled thereto. The first adhesive member AM1 may extend along the inner surface of the cover portion 43.

A second adhesive member AM2 may be disposed between the display panel 10 and the base 21 of the plate 20, and may be coupled thereto. The second adhesive member AM2 may extend in a lateral direction or in a vertical direction.

For example, each of the first adhesive member AM1 and the second adhesive member AM2 may be a piece of double-sided adhesive tape.

Figure 14:
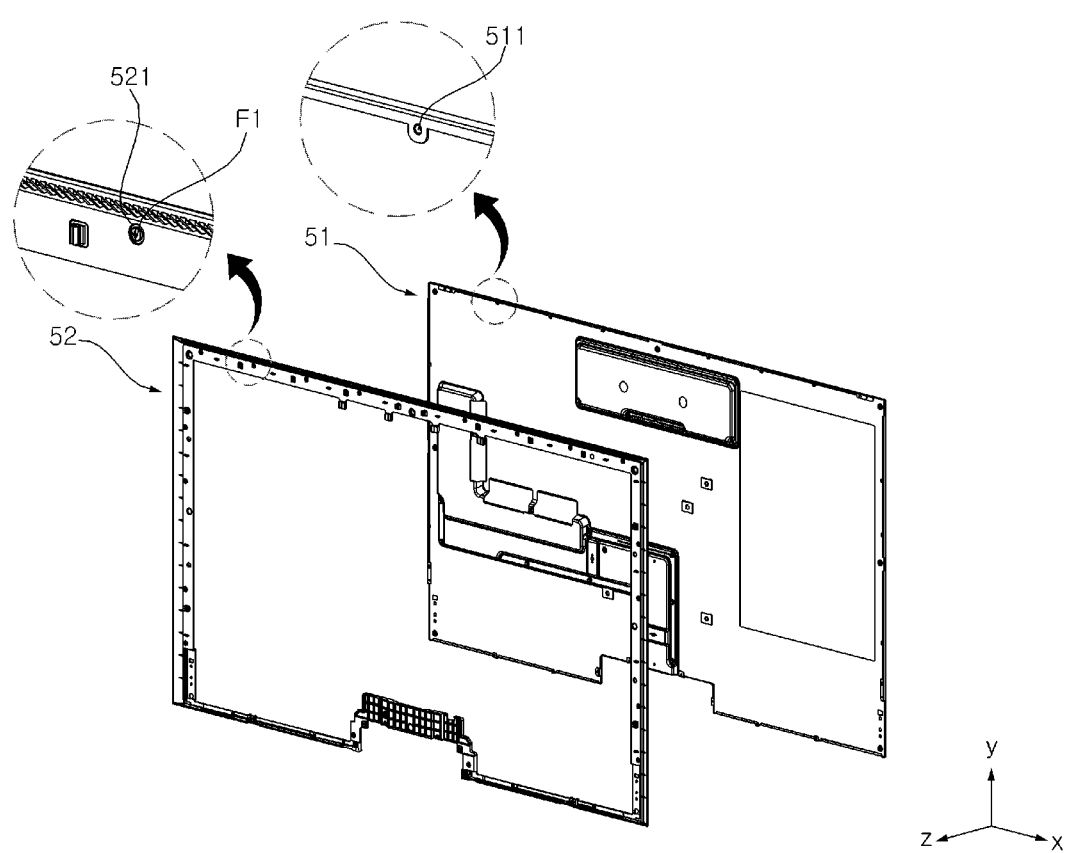

Referring to FIG. 14, the middle cover 51 may have a plurality of first holes 511 formed in the periphery thereof. Here, the side cover 52 may have a plurality of second holes 521, which are formed in the periphery thereof and are respectively aligned with the plurality of first holes 511.

The side cover 52 may be coupled to the middle cover 51 by fastening fastening elements F1, such as screws, into the plurality of first holes 511 through the plurality of second holes 521.

Figure 15:
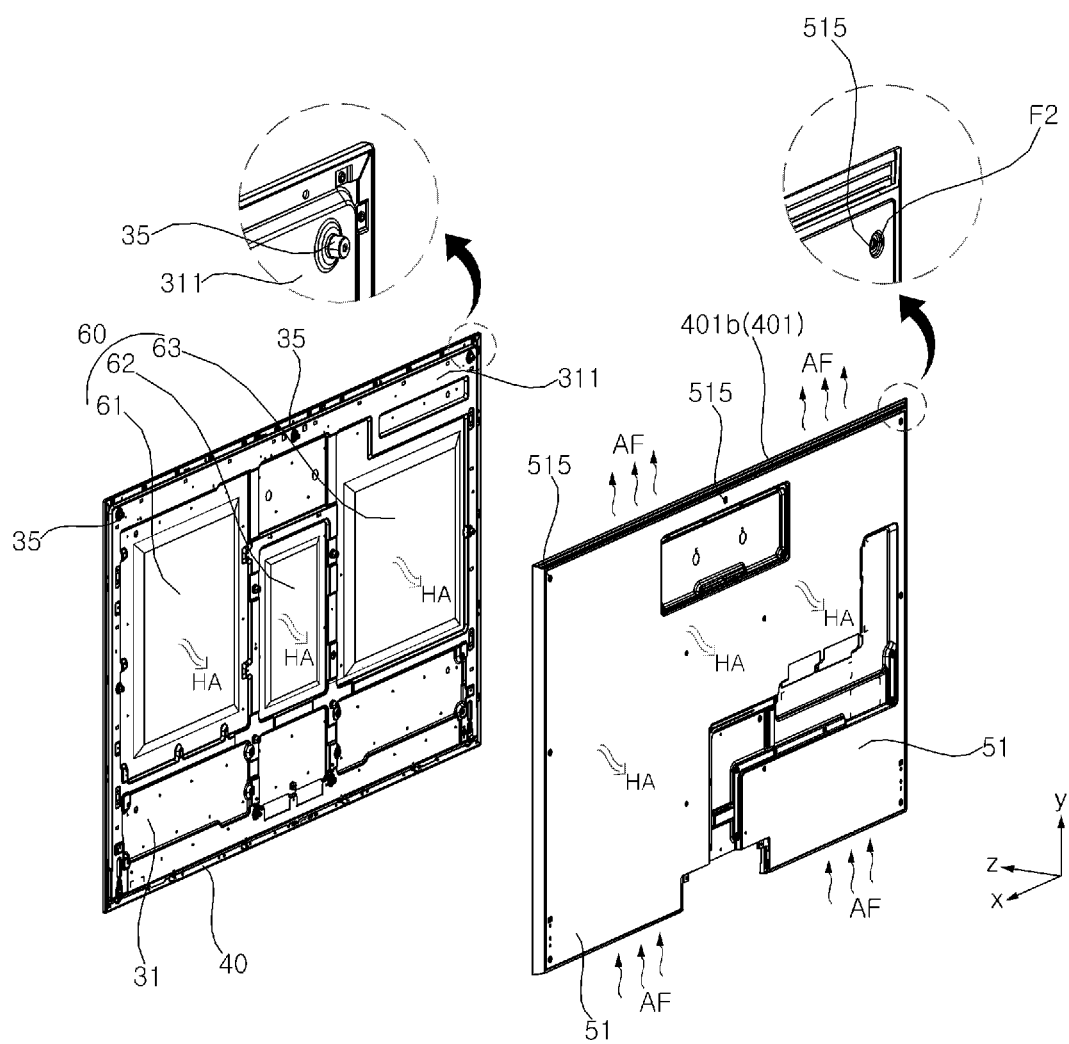

Referring to FIGS. 9 and 15, the base 31 of the frame 30 may be in contact with the rear surface of the base 21 of the plate 20. Here, the base 31 may be referred to as a contact portion. Reinforcing portions 311 and 312 of the frame 30 (see FIG. 9) may be formed by pressing the base 31 rearwards. Consequently, the reinforcing portions 311 and 312 may increase the torsional rigidity and/or bending rigidity of the frame 30.

The reinforcing portion 311 and 312 may include a first reinforcing portion 311, adjacent to the periphery of the base 31, and a second reinforcing portion 312, which is spaced apart from the first reinforcing portion 311 in the inward direction of the base 31. The first reinforcing portion 311 may be spaced apart from the rear surface of the base 21 of the plate 20 so as to define a first space S1. The second reinforcing portion 312 may be spaced apart from the rear surface of the base 21 of the plate so as to define a second space S2.

Figure 16:
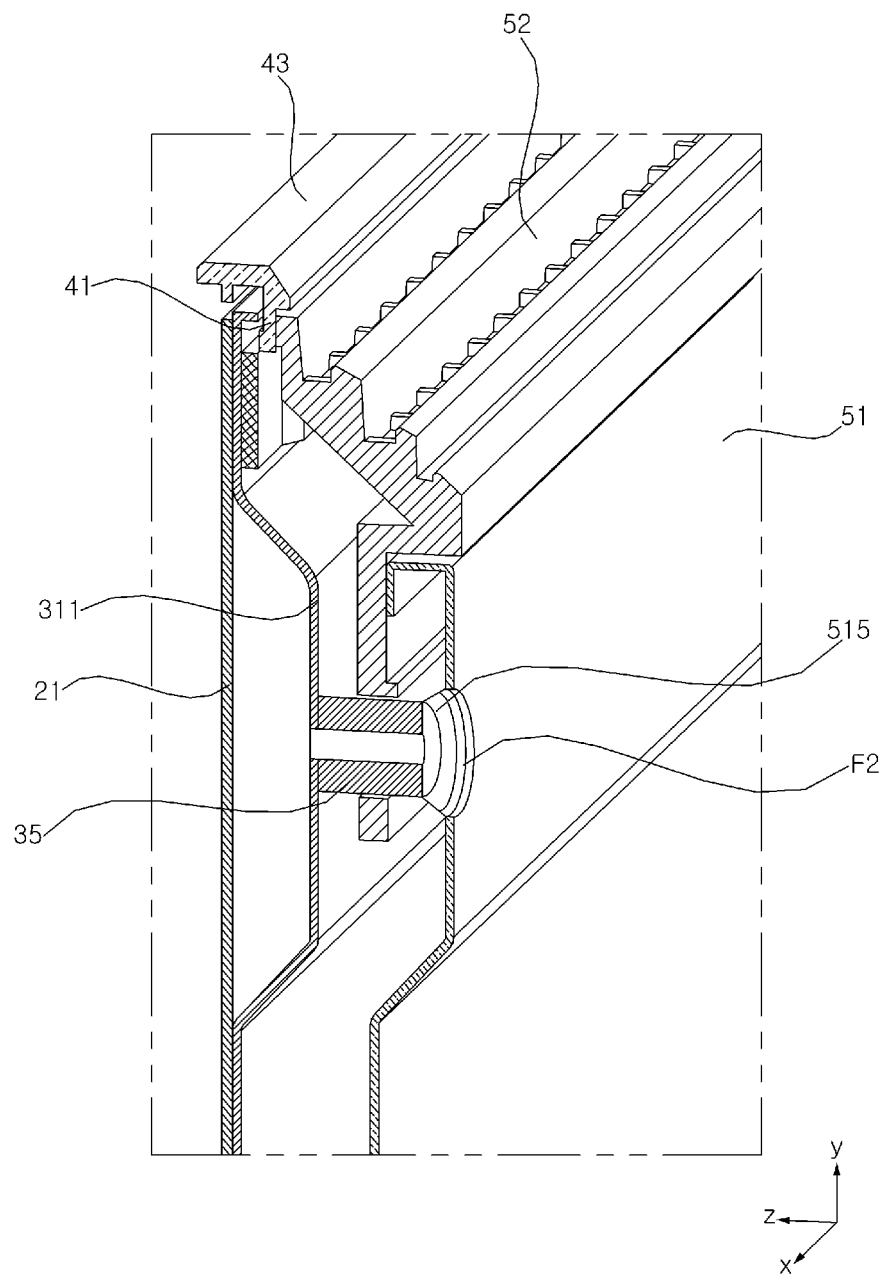

Referring to FIGS. 15 and 16, a coupling portion 35 may project rearwards from the first reinforcing portion 311. The coupling portion 35 may include a plurality of coupling portions 35, which are positioned along the first reinforcing portion 311. For example, the coupling portion 35 may be a PEM nut. The middle cover 51 may have a coupling hole 515 formed through the middle cover 51 in an anteroposterior direction. The coupling hole 515 may include a plurality of coupling holes, which are respectively aligned with the coupling portions 35.

The middle cover 51 may be coupled to the first reinforcing portion 311 by fastening fastening elements F2, such as screws, into the coupling portions 35 through the coupling holes 515.

Consequently, since the first reinforcing portion 311 and the middle cover 51 including a metal material are integrally coupled with each other, it is possible to further increase the torsional rigidity and/or bending rigidity of the display device 1.

Figure 17:
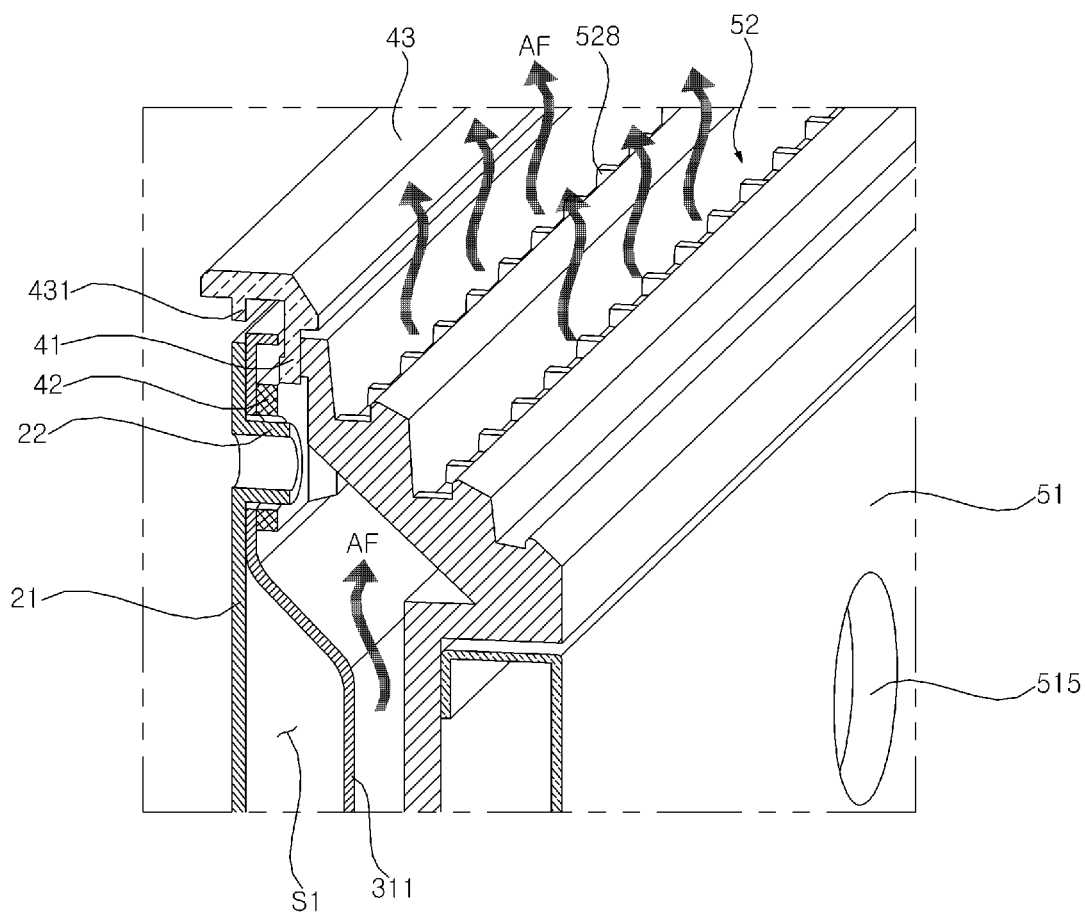

Referring to FIGS. 15 and 17, a plurality of PCBs 60 may be mounted on the first part 31 of the frame 30. The PCBs 60 may be referred to as boards. For example, the PCB may include a power supply board 61 for supplying power to individual components of the display device 1, a timing controller board 62 for providing an image signal to the display panel 10, and a main board 63 for controlling the individual components of the display device 1. The plurality of PCBs 60 may be electrically connected to each other and to the individual components of the display device 100.

A plurality of electronic elements may be mounted on the PCB 60, and heat HA may be generated in response to the operation thereof. The middle cover 51 may include a metal material and have excellent thermal conductivity. And, heat generated from the PCB 60 is discharged to the rear through the middle cover 51, so that the function of the display panel 10 may be prevented from being deteriorated or damabed by the heat generated from the PCB 60.

A hole 528 through which air is introduced or discharged may be formed at one side of the side cover 52. A plurality of holes 528 may be provided, and the side cover 52 may be preferably formed of a plastic material so that the plurality of holes 528 can be easily formed. The middle cover 51 may provide a flow path AF for air passing through the hole 528 by being spaced from the base 31 of the frame 30.

For example, in consideration of the characteristic that a relatively high temperature fluid moves upwards than a relatively low temperature fluid, the hole 528 may have an inlet hole 528a positioned at a relatively lower side and a discharge hole 528b positioned at a relatively upper side. Specifically, the inlet hole 528a may be formed on the lower side of the side cover 52 so that outdoor air may be introduced. The discharge hole 528b may be formed on the upper side of the side cover 52 so that air having a temperature rise due to heat generated from the display device 1 including heat HA generated from the PCB 60 may be discharged. In this case, the display device 1 may include a fan (not shown) mounted on the frame 30 to cause the air to flow through the inlet hole 528a and the discharge hole 528b.

In accordance with an aspect of the present disclosure, provided is a display device including a display panel, a frame positioned behind the display panel, a plate positioned between the display panel and the frame, and a side frame, which extends along an edge of the frame behind the frame and which is coupled to the frame, wherein the plate includes a base facing the frame, and a projection, which projects rearwards from the base through the frame and the side frame and which is bent at an end thereof so as to be coupled to the side frame.

In accordance with another aspect of the present disclosure, the frame may have therein a through hole, through which the projection extends, and the side frame may have therein a coupling hole, through which the projection extends, wherein the projection may include a body extending through the through hole and the coupling hole in an anteroposterior direction, and a head, which is bent at an end thereof so as to be in contact with the side frame, and wherein the frame may be secured between the base and the head.

In accordance with another aspect of the present disclosure, the side frame may include a coupling portion, which is positioned adjacent to a periphery of the frame and which extends along the edge of the frame while facing a rear surface of the frame, and a cover portion, which intersects the coupling portion and which extends along the edge of the frame so as to cover a lateral surface of the frame, wherein the coupling hole may be formed in the coupling portion, and the head may be in contact with a rear surface of the coupling portion.

In accordance with another aspect of the present disclosure, the frame may have a thickness smaller than a thickness of the coupling portion.

In accordance with another aspect of the present disclosure, the coupling portion may include a flat portion facing the rear surface of the frame, and a depressed portion, which is depressed forwards from the flat portion so as to be in contact with the rear surface of the frame and in which the coupling hole is formed, and the head may be in contact with a rear surface of the depressed portion.

In accordance with another aspect of the present disclosure, the depressed portion may include a first area in which the coupling hole is formed, a second area adjacent to the flat portion, and a third area, which is positioned between the first area and the second area and with which the head is in contact.

In accordance with another aspect of the present disclosure, the display device may further include an extension, which projects from an inner surface of the cover portion and which extends along the inner surface of the cover portion while facing a rear surface of the display panel, and an adhesive member, which is disposed between the display panel and the extension and is coupled thereto.

In accordance with another aspect of the present disclosure, the display device may further include a protrusion, which projects rearwards from the base and is fitted into the frame, wherein the frame may have a coupling hole into which the protrusion is fitted, wherein the projection may be positioned adjacent to a periphery of the base, and wherein the protrusion may be spaced apart from the projection in an inward direction of the base.

In accordance with another aspect of the present disclosure, the projection may be configured to have a form of a hollow cylinder, and the protrusion may be configured to have a form of a solid cylinder.

In accordance with another aspect of the present disclosure, the frame may include a contact portion contacting a rear surface of the plate, and a reinforcing portion, which is depressed rearwards from the contact portion so as to be spaced apart from the rear surface of the plate, and the through hole may be formed in the contact portion.

In accordance with another aspect of the present disclosure, the display device may further include a back cover configured to cover a rear surface of the frame, the back cover being coupled to the reinforcing portion.

In accordance with another aspect of the present disclosure, the back cover may include a side cover, which is positioned adjacent to the side frame and which has therein a hole, through which air is introduced and discharged, and a middle cover coupled to the side cover.

In accordance with another aspect of the present disclosure, the middle cover may be coupled to the reinforcing portion and may be spaced apart from the contact portion so as to provide a flow channel for the air passing through the hole.

In accordance with another aspect of the present disclosure, the middle cover may include a metal material, and the side cover may include a plastic material.

The effects of the display device according to the present disclosure will be described.

At least one embodiment of the present disclosure provides a display device capable of integrally coupling a plate, a frame and a side frame to one another.

At least one embodiment of the present disclosure provides a display device capable of simplifying an operation of coupling a plate, a frame and a side frame to one another.

At least one embodiment of the present disclosure provides a display device having increased torsional rigidity and/or bending rigidity.

At least one embodiment of the present disclosure provides a display device having improved heat dissipation performance.

Certain embodiments or other embodiments of the disclosure described above are not mutually exclusive or distinct from each other. Any or all elements of the embodiments of the disclosure described above may be combined with each other in configuration or function.

For example, a configuration "A" described in one embodiment of the disclosure and the drawings and a configuration "B" described in another embodiment of the disclosure and the drawings may be combined with each other. That is, even if the combination between the configurations is not directly described, the combination is possible except in the case where it is described that the combination is impossible.

Although embodiments have been described with reference to a number of illustrative embodiments thereof, it should be understood that numerous other modifications and embodiments that fall within the scope of the principles of this disclosure can be devised by those skilled in the art. More particularly, various variations and modifications are possible in the component parts and/or arrangements within the scope of the disclosure, the drawings and the appended claims. In addition to variations and modifications in the component parts and/or arrangements, alternative uses will also be apparent to those skilled in the art.

What is claimed is:

1. A display device comprising:
a display panel;
a plate positioned behind the display panel;
a frame positioned behind the plate;
a side frame extending along an edge of the frame; and
a projection projecting rearwardly from the plate through the frame and the side frame,
wherein the frame and the side frame are coupled to the projection,
wherein the projection comprises a head bent at an end of the projection so as to overlap to one of the frame or the side frame in a front-rear direction, and
wherein the other of the frame or the side frame is disposed between the plate and the one of the frame or the side frame.

2. The display device according to claim 1, wherein the head of the projection is coupled to the side frame and the frame is sandwiched between the plate and the side frame.

3. The display device according to claim 1, wherein the head of the projection is in contact with a rear side of the one of the frame or the side frame.

4. The display device according to claim 1, wherein the side frame is positioned behind the frame, and
wherein the plate comprises a base facing the frame and from which projection projects.

5. The display device according to claim 4, wherein the frame has therein a through hole, through which the projection extends, and the side frame has therein a coupling hole, through which the projection extends,
wherein the projection comprises:
a body extending through the through hole and the coupling hole in an anteroposterior direction,
wherein the head is bent at an end of the body so as to be in contact with the side frame, and
wherein the frame is secured between the base and the head.

6. The display device according to claim 5, wherein the side frame comprises:
a coupling portion, which is positioned adjacent to a periphery of the frame and which extends along the edge of the frame while facing a rear surface of the frame; and
a cover portion, which intersects the coupling portion and which extends along the edge of the frame so as to cover a lateral surface of the frame, and
wherein the coupling hole is formed in the coupling portion, and the head is in contact with a rear surface of the coupling portion.

7. The display device according to claim 6, wherein the frame has a thickness smaller than a thickness of the coupling portion.

8. The display device according to claim 6, wherein the coupling portion comprises:
a flat portion facing the rear surface of the frame; and
a depressed portion, which is depressed forwards from the flat portion so as to be in contact with the rear surface of the frame and in which the coupling hole is formed, and
wherein the head is in contact with a rear surface of the depressed portion.

9. The display device according to claim 8, wherein the depressed portion comprises:
a first area in which the coupling hole is formed;
a second area adjacent to the flat portion; and
a third area, which is positioned between the first area and the second area and with which the head is in contact.

10. The display device according to claim 6, further comprising:
an extension, which projects from an inner surface of the cover portion and which extends along the inner surface of the cover portion while facing a rear surface of the display panel; and
an adhesive member, which is disposed between the display panel and the extension and is coupled thereto.

11. The display device according to claim 5, further comprising a protrusion, which projects rearwards from the base and is fitted into the frame,
wherein the frame has a coupling hole into which the protrusion is fitted,
wherein the projection is positioned adjacent to a periphery of the base, and
wherein the protrusion is spaced apart from the projection in an inward direction of the base.

12. The display device according to claim 11, wherein the projection is configured to have a form of a hollow cylinder, and the protrusion is configured to have a form of a solid cylinder.

13. The display device according to claim 5, wherein the frame comprises:
a contact portion contacting a rear surface of the plate; and
a reinforcing portion, which is depressed rearwards from the contact portion so as to be spaced apart from the rear surface of the plate, and
wherein the through hole is formed in the contact portion.

14. The display device according to claim 13, further comprising a back cover configured to cover a rear surface of the frame, the back cover being coupled to the reinforcing portion.

15. The display device according to claim 14, wherein the back cover comprises:
a side cover, which is positioned adjacent to the side frame and which has a hole through which air is introduced and discharged; and
a middle cover coupled to the side cover.

16. The display device according to claim 15, wherein the middle cover is coupled to the reinforcing portion and is spaced apart from the contact portion so as to provide a flow channel for the air passing through the hole.

17. The display device according to claim 15, wherein the middle cover comprises a metal material, and the side cover comprises a plastic material.

* * * * *